United States Patent [19]

Peterson

[11] 4,099,366

[45] Jul. 11, 1978

[54] LAWN MOWERS

[75] Inventor: Clifford D. Peterson, Ankenny, Iowa

[73] Assignee: AMF Incorporated, White Plains, N.Y.

[21] Appl. No.: 741,592

[22] Filed: Nov. 15, 1976

[51] Int. Cl.² .......................................... A01D 55/18
[52] U.S. Cl. ..................................... 56/13.6; 56/255; 56/DIG. 22
[58] Field of Search ................... 56/6, 13.6, 192, 255

[56] References Cited

U.S. PATENT DOCUMENTS

| 2,641,100 | 6/1953 | Sylvester | 56/255 |
| 3,136,106 | 6/1964 | Joslin | 56/13.6 |
| 3,157,014 | 11/1964 | Bottenberg | 56/6 |
| 3,234,719 | 2/1966 | Rank | 56/13.6 |

*Primary Examiner*—Russell R. Kinsey
*Attorney, Agent, or Firm*—George W. Price; Walter Lewis

[57] ABSTRACT

Streaking is eliminated in a rear discharge twin-bladed grass cutter by a baffle between the two blades.

2 Claims, 4 Drawing Figures

LAWN MOWERS

This invention relates to an improvement in lawn mowers, and more particularly, to means for eliminating streaking in a twin-bladed rear discharge grass cutter.

In the drawing the invention is illustrated with respect to a riding mower in which FIG. 1 is a side perspective view;

Figure 1:
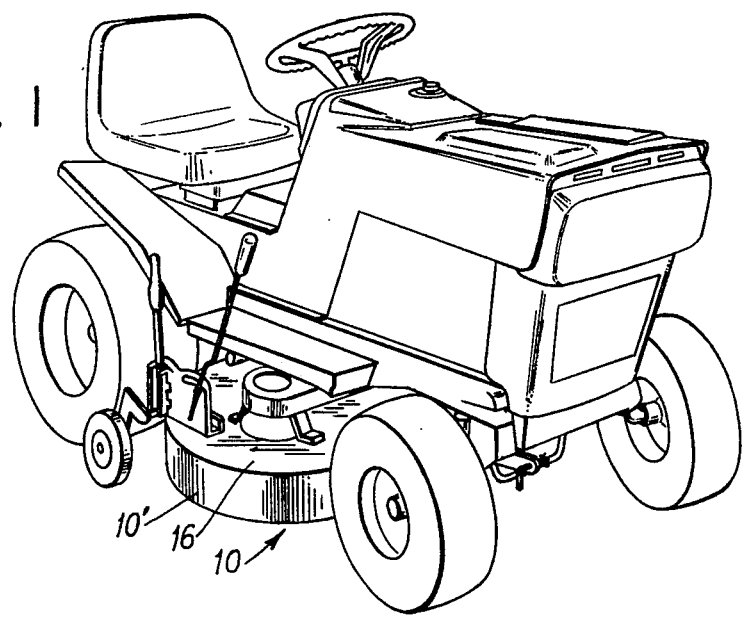
Figure 2:
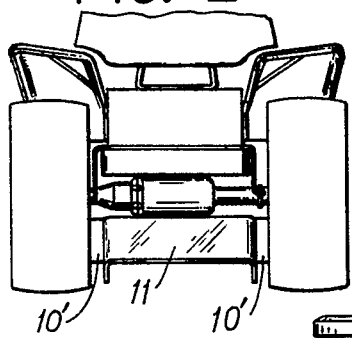
FIG. 2 is a rear view.
Figure 4:
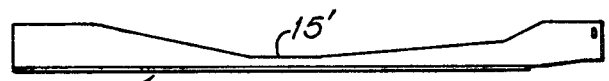
FIG. 4 is a view of just the baffle laid out flat.

Referring now particularly to the drawing, showin therein is a riding-type lawn mower having a grass cutter housing 10 suspended beneath a garden-type tractor. The tractor is well-known and has spaced front and rear wheels. Various controls, which also are well-known, and therefore will not be described, are provided above the housing 10. This includes means for driving twin blades in the housing, raising or lowering the housing to vary the height of the cut, and so forth. As shown in FIGS. 1 and 2, the housing 10 on each side extends to between the front and rear wheels for cutting close to and around bushes and the like, and the cut grass is expelled out behind the mower from between the rear wheels through a rear discharge chute 11.

Figure 3:
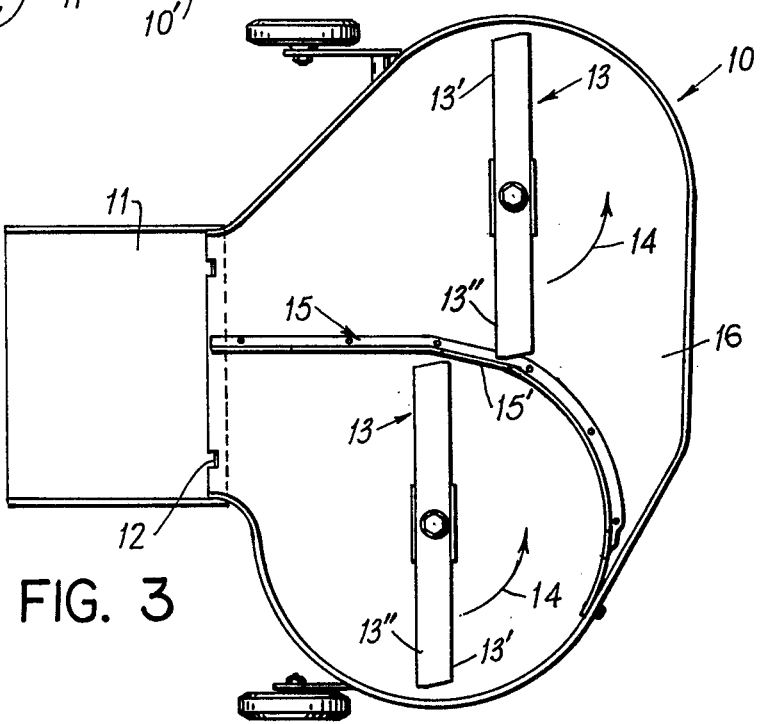
FIG. 3 is an enlarged bottom plan view of just the grass cutter housing.

Referring now also to FIG. 3, the housing 10 comprises an enclosure open at its bottom, but closed on its sides by a flange 10'. The rear chute 11 is connected to the back of the housing 10 by slot and tongue means 12 so that the rear end of chute 11 can be raised or lowered slightly with respect to the housing 10.

Positioned inside housing 10 is a pair of grass cutting blades 13. The blades are on drive shafts, bearing mounted in the top of the housing, and they are of the rotary type. That is to say, they rotate in a horizontal plane, and have leading cutting edges 13', and raised grass lifting trailing edges 13'', in a manner well-known to those skilled in the art. The blades rotate on axes offset from each other, one slightly ahead of the other, so that their cutting swathes overlap but, however, without the blades ever actually hitting each other, so that their rotation with respect to each other does not have to be timed. Both blades rotate in a counterclockwise direction when view in FIG. 3 in the direction of arrows 14.

In this type grass cutter, when a side discharge is provided, there is no streaking. However, with a rear discharge there is streaking. By streaking is meant a narrow line or swathe of grass behind the mower running along the centerline of the chute that remains uncut. It appears that due to the interplay between the air currents or vortexes created by the blades, that in their area of overlap the trailing edges 13'' fail to cause the grass to stand up, and in fact, the grass is flattened, so it is not cut.

I have discovered that by providing the baffle 15 streaking is eliminated. When viewing FIG. 3, it will be seen that the baffle 15 divides the housing into two sort of P-shaped side by side cutting compartments, one for each blade. That is to say, baffle 15 continues along the same circular or arcuate curvature as along one side of the flange 10' and then comes down along the centerline of the housing. In addition, at its opposite ends it has a height about equal to that of the flange 10', but is then gradually tapered towards its central portion, and at that part 15' of its central portion where the two blades would be lined up with each other it has a minimum height for a short distance. The baffle is mounted to the underside of the top wall 16 of the housing, so by the term height what is really meant is the depth to which the baffle depends into the grass cutter housing 10. I have discovered that this baffle causes the interplay between the air currents or vortexes created by the two blades not to behave as they apparently do, to flatten the grass in this area, but in fact allows the trailing edges 13'' to make the grass stand up to be cut so that there is no streaking.

I claim:

1. In a lawn mower having a twin-bladed grass cutter with rear discharge, said grass cutter comprising an open bottom housing having a top wall and a depending surrounding side flange, a pair of laterally spaced horizontal rotary grass cutting blades mounted in said housing between the lengthwise center line and opposite sides of said housing, said flange being discontinuous at the rear end of said center line to provide a rear opening on said housing for rear discharge of grass from said housing, and means for eliminating streaking along said center line, said means comprising a baffle mounted to said top wall and depending therefrom into said housing along said center line, wherein said opposite sides of said housing are arcuate and said baffle extends arcuately from one of said sides to between said blades and then along said center line to said rear opening, and said baffle depending into said housing to a maximum depth at each of its ends and then tapering therefrom to a minimum depth at its central portion.

2. In a lawn mower as in claim 1, said grass cutter being positioned beneath a riding-type garden tractor, said tractor having a pair of front and rear wheels, the opposite arcuate sides of said housing extending to between said front and rear wheels at opposite sides of said tractor, said rear opening facing the rear of said tractor, and a rear discharge chute connected to said rear opening, said chute extending to between said rear pair of wheels.

* * * * *